May 1, 1945.   S. P. TOWNSEND   2,375,150
MEASURING SCALE
Filed July 13, 1943
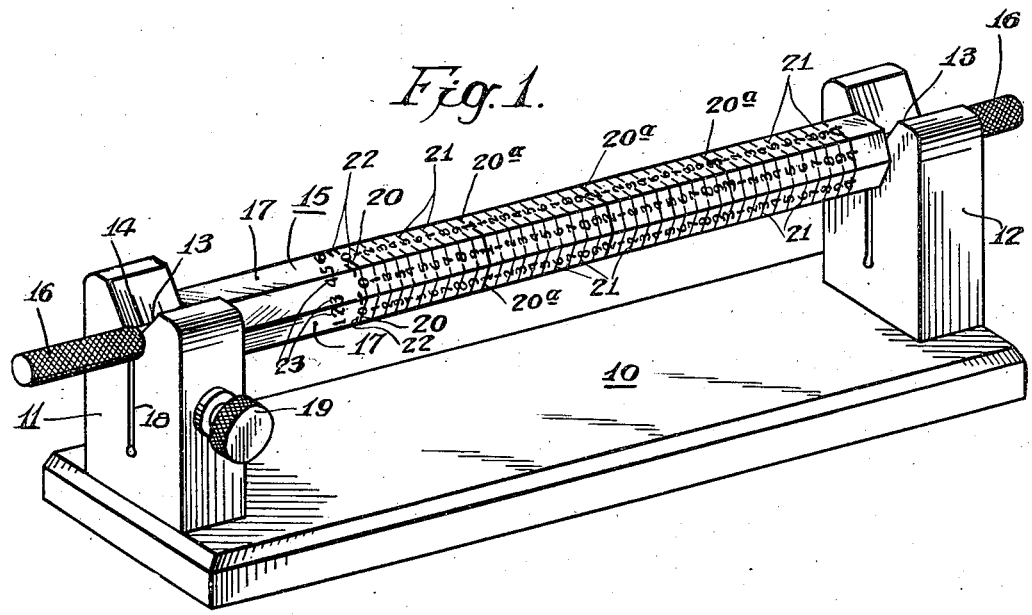
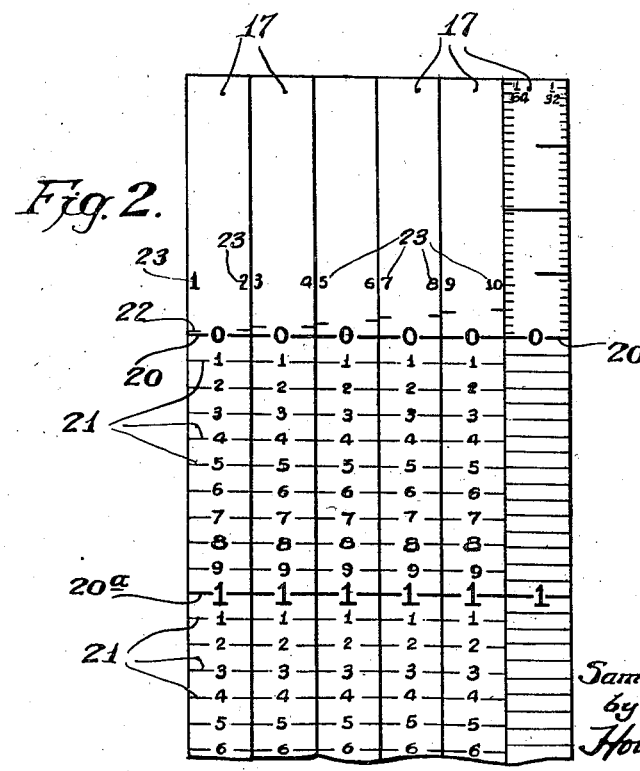
Inventor:—
Samuel P. Townsend
by his Attorneys
Howson & Howson Patented May 1, 1945

2,375,150

UNITED STATES PATENT OFFICE 2,375,150

MEASURING SCALE

Samuel P. Townsend, Maplewood, N. J.

Application July 13, 1943, Serial No. 494,517

2 Claims. (Cl. 33—107)

This invention relates to scale markings for rules and has for an important object thereof the provision of a rule enabling quick and accurate setting of dividers, calibers or the like to fine divisions of standard measuring units, such as the smaller decimals of an inch or meter.

A more specific object of the invention is the provision of a scale arrangement such that adjacent graduations, as for example, those representing .01 and .02 of an inch may be so widely separated that there is no probability of an error in their computation or discernment.

A further object of the invention is the provision of a convenient form of rule embodying my new scale arrangement.

These and other objects I attain by the construction shown in the accompanying drawing, wherein for the purpose of illustration, I have shown a preferred embodiment of my invention and wherein:

Figure 1 is a perspective view of one form of rule which may be conveniently utilized with my new scale arrangement; and Figure 2 is a fragmentary development of the scale as applied to Figure 1.

Referring now more particularly to the drawing, the numeral 10 generally designates a base having standards 11 and 12 at its ends, these standards having bearing slots 13 rotatably receiving the reduced neck portions 14 of a hexagonal rule body 15. The ends of the neck portions are somewhat increased in size and project beyond the outer ends of the standards, forming portions 16 by which the rule body may be conveniently rotated to present any of the facets 17 of the rule body to the view of the user. In order that the rule may be clamped in an adjusting position, one of the standards, at present shown as standard 11, is formed as a clamp, the standard being split as at 18 and provided with a suitable clamping screw 19 through which the neck portion 14 held by the standard may be securely gripped.

The scale applied to this rule, in accordance with my invention, comprises a zero base line 20 at one side of which the scale is provided with a plurality of well-spaced scale markings 21, the spaces between which constitute equal fractions of a distance measurement unit, these spaces being at present shown as representing 0.1 (one-tenth) of an inch. Fractional scale markings denoting the spacing of the scale markings 21 from the zero base line or from the unit graduations 20a of the scale are preferably made smaller than those associated with the zero base line 20 and unit graduations 20a so that these may be readily identified, or, if preferred, the fractional graduations may be differently colored from the unit graduations.

At the opposite side of the base line, the scale consists of graduations 22, these graduations being distinctly separated from one another in a direction longitudinal to the base line and constituting serially stepped spacings from the base line, the space between each graduation 22 and the base line 20 comprising a fractional portion of the spaces between adjacent graduations 21, as for example, 0.01, 0.02 etc. of an inch. Each graduation 22 has associated therewith an identifying indicia 23 indicating its spacing from the base line. Since the graduations 22 are widely separated they may be readily identified and located with dividers, compasses or the like.

With such an arrangement, assuming that it is desired to make such a setting as 1.61 inches, the rule is rotated to present the facets 17 bearing the identification of indicia 22 for 1. One leg of the dividers is placed on the corresponding indicia 22 and the other leg spread to engage the indicia 6 of the scale markings 21 lying beyond the unit measurement 1. Again assuming that it is desired to step off 0.66 (sixty-six hundredths) the indicia 23 for 6 locates the graduation 22 to be utilized for one leg of the dividers and the other leg is placed upon the graduation 6 lying at the opposite side of the zero base line. The scale has at present been illustrated as applied to a hexagonal rule body and since two graduations have been placed on each of the facets 17, an additional facet 17 is available for use with common fractions, such as one thirty-second and one sixty-fourth of an inch. On this facet above the zero line at one side of the facet the odd sixty-fourths are scaled from the zero line, 1/64, 3/64, 5/64 etc., while at the opposite side of the facet 1/32 graduations are provided. The sixty-fourth graduations are thus so widely separated that they may be readily identified. The scale on the opposite side of the zero line may be conveniently divided into sixteenths.

Since the rule construction employed may be considerably varied as may likewise be the particular scale arrangement, I do not wish to be understood as limiting myself to the particular construction or arrangement illustrated except as hereinafter claimed.

I claim:

1. A scale having a base line, graduations at one side of the base line, the spaces between said graduations consisting of uniform divisions of a measurement unit of the order of 1/10 of an inch and a series of graduations at the opposite side of the base line, said graduations being common to the first-named graduations and being distributed longitudinally of the base line and differently spaced therefrom longitudinally of the scale, the spaces between the last-named graduations and the base line comprising a complete series of fractions of the first-named divisions having common denominators and means associated with each of the last-named graduations indicating their spacing from the base line.

2. A scale having a base line, graduations at one side of the base line, the spaces between said graduations consisting of uniform decimal divisions of a measurement unit and a stepped series of graduations at the opposite side of the base line, said graduations being common to the first-named graduations and being distributed longitudinally of the base line and differently spaced therefrom longitudinally of the scale, the spaces between the last-named graduations and the base line comprising a complete series of decimal fractions of the first-named divisions having common denominators, and means associated with each of the last-named graduations indicating their spacing from the base line.

SAMUEL P. TOWNSEND.